United States Patent Office 3,759,903
Patented Sept. 18, 1973

3,759,903
THIAZOLINYL AND THIAZINYL DERIVATIVES OF INDAZOLES
Rudiger D. Haugwitz, Highland Park, and Venkatachala L. Narayanan, Hightstown, N.J., assignors to E. R. Squibb & Sons, Inc., New York, N.Y.
No Drawing. Filed July 28, 1971, Ser. No. 166,959
Int. Cl. C07d 93/06
U.S. Cl. 260—243 R  10 Claims

ABSTRACT OF THE DISCLOSURE

Thiazolinyl and thiazinyl derivatives of indazoles are provided having the structure

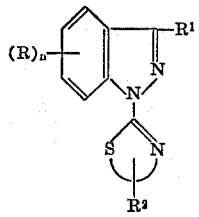

which are useful as anthelmintic agents.

---

The present invention relates to thiazolinyl and thiazinyl derivatives of indazoles having the structure (I)

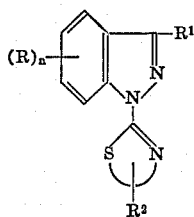

wherein R is hydrogen, lower alkyl, lower alkoxy, aryl, acyl, aroyl, aryloxy, nitro, halogen, cyano, amido, substituted amido

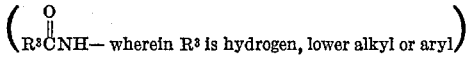

amino, substituted amino, dialkylaminoalkyl, alkyloxy— or aryloxycarbonyl

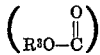

carboxyl, carbamate ester (—NHCOOR⁴ wherein R⁴ is alkyl or aryl) or ureido or thioureido $$\text{(R}^5\text{NH}\overset{\text{O}}{\overset{\|}{\text{C}}}\text{NH, Q is O or S and R}^5\text{ is alkyl, aryl or cycloalkyl)}$$

$R^1$ is hydrogen, lower alkyl, aryl, —$(CH_2)_{n^1}$—$CO_2R^2$, cyano, halogen or dialkylaminoalkyl, $R^2$ can be hydrogen, lower alkyl, or aryl; $n$ is 1 or 2 $n^1$ is 0, 1, 2, or 3.

The radical

represents a 5- or 6-membered ring containing 3 or 4 carbon atoms, respectively, wherein the additional 2 or 3 carbon atoms (not shown) may have attached a substituent other than hydrogen as indicated above.

The lower alkyl groups represented by the above R groups include straight or branched chain aliphatic hydrocarbon radicals having up to seven carbon atoms, such as methyl, ethyl, propyl, isopropyl, butyl, isobutyl, t-butyl, amyl, hexyl, heptyl, and the like. The lower alkyl groups can include as substituents any of the aryl groups mentioned below as well as halogen.

The alkoxy group or that portion of the alkoxycarbonyl group includes straight and branched chain radicals of up to and including seven carbon atoms, coresponding to the above alkyl groups, e.g., methoxy, ethoxy, propoxy, isopropoxy, and the like. The aryloxy group or that portion of the aryloxycarbonyl group includes any of the aryl groups set out below.

The term "halogen" includes each of the four halogens, but fluorine and chlorine are preferred.

The substituted amido groups

wherein $R^3$ can be lower alkyl, arylalkyl, alkylaryl or aryl, wherein lower alkyl and aryl are as defined herein, can include methylamido, ethylamido, isopropylamido, heptylamido, phenylamido, benzylamido, or naphthylamido.

The substituted amino groups include mono- or di-lower alkyl-, arylalkyl-, lower alkylaryl- or arylamino wherein lower alkyl and aryl are as defined herein, such as methylamino, ethylamino, isopropylamino, heptylamino, dimethylamino, diethylamino, ethylmethylamino, butylmethylamino, ethyl i-propylamino, anilino, benzylamino, diphenylamino, naphthylamino, or N-methyl-N-phenylamino and the like.

The term "aryl" includes monocyclic or bicyclic monovalent aromatic ring systems such as phenyl or naphthyl. These aryl radicals can include as substituents halogen, nitro, trifluoromethyl, alkoxy, alkanoic acid, amido or substituted amido as defined above or any of the alkyl groups mentioned hereinbefore.

The acyl and aroyl groups included herein are derived from hydrocarbon carboxylic acids of less than twelve carbon atoms, which may be exemplified by the lower alkanoic acids (e.g., formic, acetic, propionic, butyric, valeric, trimethyl acetic and caproic acids), the lower alkenoic acids (e.g., acrylic, methacrylic, crotonic, 3-butenoic and senecioic acids), the monocyclic aryl-carboxylic acids (e.g., benzoic and toluic acids), the monocyclic aryl-lower alkanoic acids [e.g., phenacetic, β-phenylpropionic, α-phenylbutyric, and 5 - (p-methylphenyl) pentanoic acids], the cycloalkyl carboxylic acids (e.g., cyclobutane carboxylic acid, cyclopentane carboxylic acid and cyclohexane carboxylic acid), the cycloalkenyl carboxylic acids (e.g., 2-cyclobutene carboxylic acid and 3-cyclopentene carboxylic acid), the cycloalkyl and cycloalkenyl - lower alkanoic acids [e.g., cyclohexaneacetic, α-cyclopentanebutyric, 2-cyclopenteneacetic and 3-(3-cyclohexene)pentenoic acid], and the like.

Exemplary of compounds falling within the present invention include, but are not limited to, the following set in Table A:

TABLE A

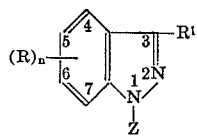

| | R | n | R¹ | Z |
|---|---|---|---|---|
| 1 | H | ----- | CH₃ | ![thiazoline] |
| 2 | Cl (5) | 1 | —CH₂—C₆H₅ | Same as above. |
| 3 | NO₂ (6) | 1 | CH(CH₃)₂ | Do. |
| 4 | CH₃ (5, 6) | 2 | C₂H₅ | Do. |
| 5 | CH₃O (4) | 1 | —C₆H₄—Cl | Do. |
| 6 | CN (5) | 1 | H | Do. |
| 7 | CH₃OC(O)NH (6) | 1 | CN | Do. |
| 8 | H | ----- | —C₆H₄—OCH₃ | Do. |
| 9 | CH₃OC(O)—NH— (5) | 1 | H | Do. |
| 10 | Br (5) | 1 | C₃H₇ | Do. |
| 11 | N(CH₃)₂ (6) | 1 | —C₆H₄—Br | 4-methyl thiazoline |
| 12 | I (5) | 1 | Cl | Same as above. |
| 13 | Cl (4, 7) | 2 | CH₃ | 2-thiazine |
| 14 | C₂H₅C(O) (5) | 1 | —CH₂—C₆H₅ | Same as above. |
| 15 | C₆H₅O— (5) | 1 | —COOH | Do. |
| 16 | C₆H₅ (5) | 1 | —CH₂—COOCH₃ | Do. |
| 17 | CH₃O (5, 6) | 2 | H | 5-phenyl thiazoline |
| 18 | CN (4) | 1 | CH(CH₃)₂ | Do. |
| 19 | C₆H₅CH₂ (5) | 1 | H | Do. |
| 20 | NO₂ (6) | 1 | —C₆H₄—F | Do. |
| 21 | CH₃—C₆H₄O (5) | 1 | —CH₂—COOCH₂C₆H₅ | Do. |
| 22 | Cl—C₆H₄— (5) | 1 | —CH₂COOH | 4-methyl thiazoline |
| 23 | CH₃—C₆H₄— (6) | 1 | H | thiazoline |

TABLE A—Continued
| | R | n | R¹ | Z |
|---|---|---|---|---|
| 24 | C₂H₅<br>\N—(CH₂)₂— (5)<br>C₃H₇ | 1 | CH₂—COOC₆H₅ | 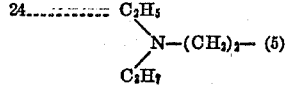 |
| 25 | C₆H₅OC(=O)— (6) | 1 | (CH₃)₂NC₂H₄— | 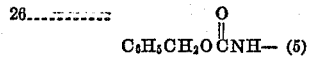 |
| 26 | C₆H₅CH₂OC(=O)NH— (5) | 1 | Br | 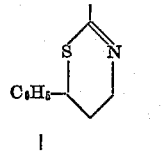 |
| 27 | CH₃NHC(=O)NH— (6) | 1 | CN | 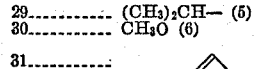 |
| 28 | 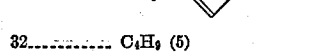 (piperidine-NHC(=O)—) | 1 | —COOC₆H₄—p-CH₃ | 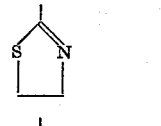 |
| 29 | (CH₃)₂CH— (5) | 1 | H | Same as above. |
| 30 | CH₃O (6) | 1 | C₆H₅ | Do. |
| 31 | CH₃O—C₆H₄—CH₂— (5) | 1 | CH₂COOH | 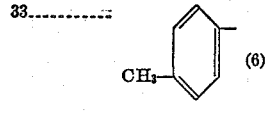 |
| 32 | C₄H₉ (5) | 1 | Cl | 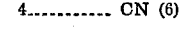 |
| 33 | CH₃—C₆H₄— (6) | 1 | H |  |
| 34 | CN (6) | 1 | C₆H₅—CH₂— | 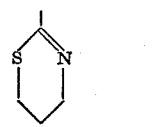 |
| 35 | C₅H₁₁ (6) | 1 | C₆H₅— | 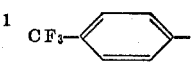 |
| 36 | (CH₃)₂N—(CH₂)₃—NH (5) | 1 | CF₃—C₆H₄— | 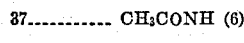 |
| 37 | CH₃CONH (6) | 1 | NO₂—C₆H₄— | 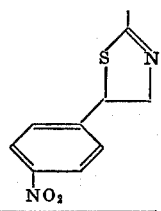 |

Compounds of Formula I can be prepared by first converting the indazole (II) into its salt (III) by reacting (II) with a base such as a metal hydride for example sodium hydride, a metal amide, such as sodium amide, an alkali metal alkoxide, such as sodium methoxide, potassium ethoxide or sodium butoxide,

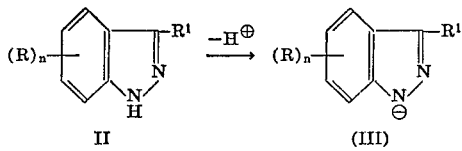

The above reaction can be brought about in a variety of aprotic solvents such as aromatic hydrocarbons, e.g., benzene, toluene or xylene, or ethers such as ethyl ether or glyme, at temperatures ranging from about 0° to about 150° for periods of about one hour to twenty-four hours. A slight excess of the base is desirable; thus the molar ratio of indazole (II) to base can range from about 1:1 to about 1:2.

The salt (III) is reacted with an aliphatic haloalkylisothiocyanate (IV) to yield thiourea (V) which undergoes intramolecular alkylation to form the indazoles (I).

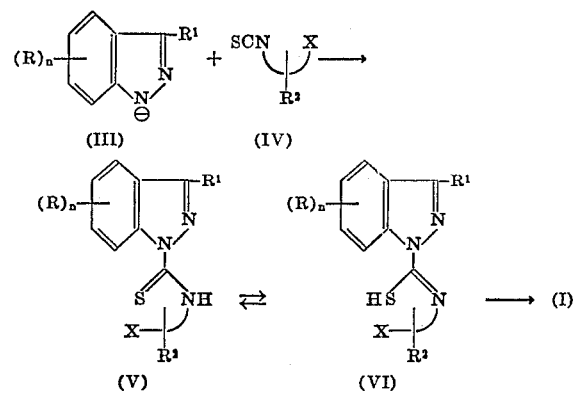

wherein X is Cl or Br and the portion

(which links N and X) in structure (IV) represents a chain of 2 or 3 carbon atoms one carbon atom of which may include an $R^2$ substituent other than hydrogen.

The salt (III) is reacted with an aliphatic haloalkylisocyanate (IV) can range from 1:1 to 1:5. The reaction time can vary from about 1 to about 10 hours at temperatures from about 35° to about 150°.

The preparation of a variety of indazoles is well documented in Elderfield's *Heterocyclic Compounds*, vol. 5, pages 45–193, John Wiley and Sons, Inc., New York, 1957.

It is to be understood that unsubstituted indazoles (II), that is where R is hydrogen, can be employed to form compounds of Formula I and thereafter any of the other R radicals can be inserted in the indazole ring in place of one or two hydrogens, employing conventional procedures as will be apparent to one skilled in the art.

Haloalkylisothiocyanates (IV) are readily synthesized from their corresponding haloalkyl amines (VII) and thiophosgene:

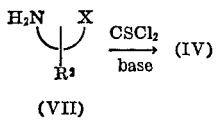

Additional routes toward compounds of structure (IV) are described in Houben-Weyl's Methoden der Organischen Chemie, vol. 9, G. Thieme Verlag Stuttgart, 1955.

Indazoles containing a free imino hydrogen are virtually tautomeric systems, differing in the position of the imino hydrogen as seen below (A⇌B). These indazoles react like tautomeric mixtures of the two possible forms. The reaction products (C and D) are not necessarily obtained in equal parts but in proportions that differ from compound to compound, substituents and reaction conditions having a pronounced effect on the course of the reaction.

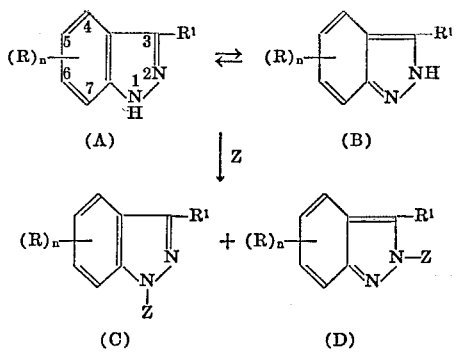

Examples of indazole starting materials (II) which can be employed herein include the following:

TABLE B

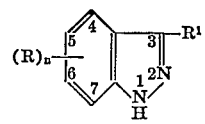

| | R | n | $R^1$ |
|---|---|---|---|
| 1 | 5-NO$_2$ | 1 | H |
| 2 | 5-C$_6$H$_5$C(O)— | 1 | Cl |
| 3 | 5-C$_6$H$_5$CH$_2$ | 1 | C$_6$H$_5$ |
| 4 | 5,6-di-CH$_3$ | 2 | C$_6$H$_5$CH$_2$— |
| 5 | 5-C$_6$H$_5$—O—C(O) | 1 | CH$_2$COOH |
| 6 | 5-N(CH$_3$)$_2$—C(O) | 1 | C$_6$H$_5$C$_2$H$_4$— |
| 7 | 5-NO$_2$ | 1 | —C$_6$H$_4$—OCH$_3$ |
| 8 | H | | C$_6$H$_{13}$ |
| 9 | 5-C$_2$H$_5$O | 1 | CH$_3$ |
| 10 | 7-CN | 1 | F |
| 11 | 5-CH$_3$O | 1 | Br |
| 12 | 5,6-di-Cl | 2 | H |
| 13 | 5-F | 1 | CN |
| 14 | 5-CF$_3$—C$_6$H$_4$ | 1 | —C$_2$H$_4$COOH |
| 15 | C$_4$H$_9$ | 1 | —CH$_2$COOH |
| 16 | 6-C$_6$H$_5$O— | 1 | —CH$_2$—COOCH$_3$ |
| 17 | 5-C$_6$H$_5$C(O)— | 1 | —CH$_2$—COOC$_6$H$_5$ |
| 18 | 6-C$_6$H$_5$C(O)NH | 1 | C$_6$H$_5$ |
| 19 | 6-C$_6$H$_5$CH$_2$OC(O)NH | 1 | (C$_2$H$_5$)$_2$NCH$_2$CH$_2$— |

Examples of aliphatic haloalkylisothiocyanates which can be employed herein include the following:

$$SCN-CH_2CH_2Br$$

$$SCN-CH_2CH_2CH_2Cl$$

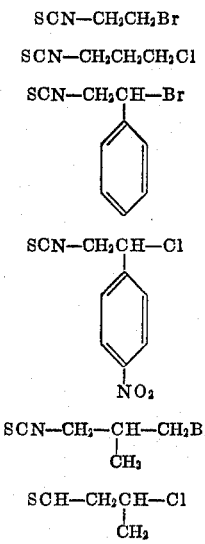

$$SCN-CH_2-CH-CH_2Br$$
$$\phantom{SCN-CH_2-}CH_3$$

$$SCH-CH_2CH-Cl$$
$$\phantom{SCH-CH_2}CH_3$$

The compounds of Formula I form physiologically acceptable acid-addition salts with inorganic and organic acids. These acid-addition salts frequently provide useful means for isolating the product from reaction mixtures by forming the salt in a medium in which it is insoluble. The free base may then be obtained by neutralization, e.g., with a base such as sodium hydroxide. Then any other salt may again be formed from the free base and the appropriate inorganic acid. Illustrative are the hydrohalides, especially the hydrochloride and hydrobromide which are preferred, sulfate, nitrate, phosphate, oxalate, tartrate, maleate, fumarate, citrate, succinate, methanesulfonate, benzenesulfonate, toluenesulfonate, and the like.

The indazoles dessribed herein have anthelmintic activity and are useful in the treatment and/or prevention of helminthiasis, a parasitic disease which causes widespread and often serious infection in domesticated animals such as swine, horses, cattle, sheep and goats. In treating domesticated animals, the compounds may be mixed with a nontoxic, edible carrier to form a feed supplement which is then incorporated in the animal feed in the desired concentration, or they may be administered in unit dosage forms which, in the case of large domesticated animals, take the form of boluses, or in the form of a liquid drench. Alternatively, water-soluble salts or a dispersable, wettable powder containing the anthelmintic agent may be added to the drinking water of the animals.

The preferred dosage level for treating a helminth infection will depend to a large extent on the particular indazole compound being employed, on the severity of the infection and on the particular species of animal to be treated. In general, the indazoles exhibit anthelmintic activity when administered to animals in a daily dose of about 50 to about 300 mag. per kilogram of animal body weight. It is preferred to employ in the range of 100–200 mg. per kilogram of body weight per day. The compounds may be given in a single dose or divided into a plurality of smaller doses. If desired, the course of treatment may be extended over a period of days in which case the optimum daily dose level may be lowered. When the compounds are to be employed primarily as prophylactic agents for the prevention of helminthic infections, the preferred daily dose level is, of course, lower than the therapeutic level is, preferably in the range of about 10–70 mag. per kilogram of body weight. The indazoles may be incorporated in the animal feeds, and this method of administration is preferred when the compounds are to be used prophylactically, in which case they are incorporated in the feeds at concentrations such that the animal will consume daily from about 10 to about 70 mg. of indazole per kilogram of body weight.

The means employed for administering these indazoles to animals are not critical, and any of the methods now used or available for treating animals infected with or susceptible to parasitic infections are satisfactory. When these substances are employed therapeutically to treat an established infection, they are conveniently administered in a unit dosage form such as in a capsule, bolus, tablet, or as a liquid drench. It will be noted that all of these methods contemplate oral administration, since this is the most effective method of treating the worm-infested stomach or intestinal tract.

When the indazoles are to be administered in unit dosage form, capsules, boluses or drenches containing the desired amount of anthelmintic distributed in a pharmaceutically acceptable vehicle are usually employed. These are prepared by intimately and uniformly mixing the active ingredient with suitable finely divided diluents, suspending agents, fillers, disintegrating agents and/or binders such as starch, lactose, talc, magnesium stearate, vegetable gums and the like. These unit dosage formulations may be widely varied with respect to their total weight and content of anthelmintic agent, depending on factors such as the type of host animal to be treated, the dose level desired, and the severity and type of parasitic infestation. For large animals such as sheep, swine or cattle, boluses weighing up to 15 grams may be used, although it is preferred to employ boluses weighing from 2–10 grams and containing from 1–5 grams of the anthelmintic agent. These boluses, as well as smaller size tablets, contain binders and lubricants, and are compounded by techniques known in this art. Capsules are readily prepared by mixing the active ingredient with a diluent such as starch or lactose and filling into the capsule.

In order to treat infected animals by means of a drench, the indazoles are mixed with a suspending agent such as bentonite and the solid product added to water just prior to administration. The preferred drenches in accordance with this invention contain from about 5–50% by weight of indazole compound.

The indazoles described herein may also be administered as a component of the feed of the animals or dissolved or suspended in the drinking water. According to the invention, novel feed and feed supplement compositions are provided in which compounds of Formula I above are present as an active anthelmintic ingredient. Such compositions comprise the indazoles intimately dispersed in or admixed with an inert carrier or diluent, i.e. one that is nonreactive with respect to the indazole and that may be administered with safety to the animals. The carrier or diluent is preferably one that is or may be an ingredient of the animal ration.

In the feed supplement compositions the active ingredient is present in relatively large amounts. These supplements are suitable for addition to the feed either directly or after an intermediate dilution or blending step. Example of carriers or diluents suitable for such compositions are solid orally ingestible carriers such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The anthelmintic agents are intimately dispersed or admixed throughout the solid inert carrier by methods such as grinding, stirring, milling, or tumbling. By selecting proper diluents and by altering the ratio of carrier to active ingredient, compositions of any desired concentration may be prepared. Formulations containing from about 5% to about 50% by weight, and preferably from about 10–30% by weight, of active ingredient are particularly suitable for addition to feeds. The active compound is normally dispersed or mixed uniformly in the diluent but in some instances may be sorbed on the carrier.

Feed supplements are prepared by uniformly mixing the appropriate indazoles with the carrier or carriers. Such supplements are added to the finished animal feed in an amount adequate to give the final concentration desired for controlling or treating helminthiasis by way of the animal ration. Although the preferred level in feeds will depend on the particular compound being employed, the anthelmintic compounds of this invention are normally fed at levels of 0.10–2.0% in the feed. One advantageous method of administering the compounds of this invention to animals whose feeds are conveniently pelleted, such as sheep, is to incorporate them directly in the pellets. For instance, indazoles are readily incorporated in nutritionally adequate alfalfa pellets (during the pelleting operation) at levels of 0.5 to 5 grams per pound of pellets for therapeutic use, and at lower levels for prohpylactic use, and such pellets fed to the worm-infested animals. Alternatively, the indazoles may be incorporated in salt licks or salt blocks at any desired concentration (concentrations of 5–25% by weight are conveniently employed). Large animals such as sheep, cattle and goats, then receive the anthelmintics with their salt.

The indazole derivatives of the invention are also useful as anti-inflammatory agents. They may be used to decrease joint swelling, tenderness, pain and stiffness in mammalian species, e.g., in conditions such as rheumatoid arthritis. Compounds of Formula I may be compounded for such use according to accepted pharmaceutical practice in oral dosage forms such as tablets, capsules, elixirs or powders for administration of about 100 mg. to 2 gm. per day, preferably 100 mg. to 1 gm. per day in two to four divided doses.

The following examples further illustrate and represent preferred embodiments of the invention:

EXAMPLE 1

5-nitro-1-(2-thiazolin-2-yl)-1H-indazole

To a solution of 5.0 g. 5-nitroindazole in about 100 ml. dry glyme there is added 1.4 g. sodium hydride (50% mineral oil dispersion) and after 1 hour, 3.8 g. 2-chloroethylisothiocyanate. The mixture is refluxed for 2 hours, the solvent is evaporated under vacuum and water is added to the residue. The formed solid is filtered, dried and crystallized from benzene to yield 3.0 g., M.P. 235–236°.

Calcl. for $C_{10}H_8N_4O_2S$ (percent): C, 48.37; H, 3.25; N, 22.56. Found (percent): C, 48.59; H, 3.32; N, 22.79.

EXAMPLE 2

1-(2-thiazolin-2-yl)-1H-indazole

Following the procedure for Example 1 but substituting indazole for 5-nitroindazole the title compound is obtained.

EXAMPLE 3

3-cyano-1-(2-thiazolin-2-yl)-1H-indazole

Foilowing the procedure of Example 1 but substituting 3-cyanoindazole for indazole the title compound is obtained.

EXAMPLE 4

1-(5,6-dihydro-4H-1,3-thiazin-2-yl)-5-nitro-1H-indazole

To a solution of 5.0 g. 5-nitroindazole in about 100 ml. dry glyme there is added 1.4 g. sodium hydride (50% mineral oil dispersion). After stirring at room temperature for 1 hour there is added 5.5 g. 3-bromopropylisothiocyanate and the mixture is refluxed for 2 hours. The solvent is removed under vacuum, water is added and the resulting solid is filtered and crystallized from benzene to give 2.7 g., M.P. 212–215°.

Calcd. for $C_{11}H_{10}N_4O_2S$ (percent): C, 50.59; H, 3.85; N, 21.36. Found (percent): C, 50.27; H, 4.12; N, 21.16.

EXAMPLE 5

1-(5,6-dihydro-4H-1,3-triazin-2-yl)-1H-indazole

Following the procedure of Example 4, but substituting indazole for 5-nitroindazole, the title compound is obtained.

EXAMPLES 6 TO 67

Following the procedure of Examples 1 to 5 but substituting the indazole derivative shown in column 1 of Table I below and the aliphatic haloalkylisothiocyanate shown in column 2, the product shown in column 3 is obtained.

Where the indazole starting material is monosubstituted and includes a substituent at the 5 or 6 position, then the product shown in column 3 will include the 6-tautomer or 5-tautomer respectively; where the indazole starting material is monosubstituted and includes a substituent at the 4 or 7 position, then the product shown in column 3 will include the 7-tautomer or 4-tautomer, respectively.

TABLE I

| Ex. No. | Column 1 | | | Column 2 Haloalkylisothiocyanate | Column 3 | |
|---|---|---|---|---|---|---|
| | R (position) | n | $R^1$ | | | |
| 6 | H | | $C_6H_5$ | $SCH-CH_2-CH_2-Br$ | As in Column 1 | |
| | H | | $H_3C-$ (phenyl) | Same as above ... do | Same as above. | |

TABLE I—Continued

| | Column 1 | | Column 2 | Column 3 |
|---|---|---|---|---|
| | (R)ₙ-indazole with R¹ | | Haloalkylisothiocyanate | (R)ₙ-indazole with R¹ and thiazoline/thiazine ring with R² |

| Ex. No. | R (position) | n | R¹ | | (R)ₙ (position) R¹ |
|---|---|---|---|---|---|
| 8 | H | — | 2-Cl-C₆H₄ | SCH—CH₂—CH₂—Br | As in Column 1 ..... thiazoline |
| 9 | CH₃ (5) | 1 | 4-CH₃-C₆H₄ | ...do... | ...do... Do. |
| 10 | NO₂ (5) | 1 | 2,3-Cl₂-C₆H₃ | ...do... | ...do... Do. |
| 11 | Cl (5,6) | 2 | 2-naphthyl | ...do... | ...do... Do. |
| 12 | H | — | CN | ...do... | ...do... Do. |
| 13 | CH₃OCONH (5) | 1 | C₆H₅ | ...do... | ...do... Do. |
| 14 | CH₃CONH (6) | 1 | 4-OCH₃-C₆H₄ | ...do... | ...do... Do. |
| 15 | C₆H₅CH₂OCONH (5) | 1 | 4-CH₃-C₆H₄ | SCN—CH₂CH₂CH₂—Cl | ...do... thiazine |
| 16 | C₆H₅CONH (5) | 1 | C₆H₅ | Same as above | ...do... Same as above. |
| 17 | C₂H₅CONH (5) | 1 | —CH₂C₆H₅ | ...do... | ...do... Do. |
| 18 | C₂H₅OCONH (5) | 1 | Cl | ...do... | ...do... Do. |
| 19 | H | — | C₉H₁₉ | ...do... | ...do... Do. |
| 20 | (C₂H₅)NH (6) | 1 | C₆H₅ | SCH—CH₂CH₂—Br | ...do... Do. |
| 21 | H | — | CH₃ | Same as above | ...do... Do. |
| 22 | CN (6) | 1 | CH₂Cl | ...do... | ...do... Do. |
| 23 | NO₂ (5) | 1 | 4-NO₂-C₆H₄ | ...do... | ...do... Do. |
| 24 | NO₂ (5) | 1 | 4-Cl-C₆H₄ | ...do... | ...do... Do. |
| 25 | H | — | 3-NO₂-C₆H₄ | ...do... | ...do... Do. |
| 26 | H | — | H | ...do... | ...do... Do. |
| 27 | H | — | CH₂-C₆H₄-NO₂ | SCN—CH₂CHCl-C₆H₅ | ...do... thiazoline with C₆H₅ |
| 28 | H | — | —CH₂COOH | SCN—CH₂—CH₂Br | ...do... thiazoline |
| 29 | CH₃ (4) | 1 | CH₂CH₂N(CH₃)₂ | SCN—CHCH₂Cl / CH₃ | ...do... thiazoline with CH₃ |
| 30 | Cl (5) | 1 | CH₂CN | SCN—CH₂CH₂Cl | ...do... thiazoline |

TABLE I—Continued

| | Column 1 | | Column 2 Haloalkylisothiocyanate | Column 3 | |
|---|---|---|---|---|---|
| Ex. No. | R (position) | n R¹ | | | (R)ₙ (position) R¹ |
| 31 | H | —⟨C₆H₄⟩—CN | SCN—CH₂CH₂Br | As in Column 1 | thiazoline |
| 32 | NO₂ | 1 CO₂CH₃ | SCN—CH₂CH₂Cl | do | Do. |
| 33 | H | C₄H₉ | SCN—CHCH₂—Br  \|  C₂H₅ | do | thiazoline-C₂H₅ |
| 34 | Br (5) | 1 Br | SCN—CH₂CH₂Cl | do | thiazoline |
| 35 | C₂H₅OC(O)—CH₂— (6) | 1 H | SCNCH₂CH₂Cl | do | Same as above. |
| 36 | H | CN | SCNCH₂CH₂CH₂Br | do | thiazine |
| 37 | H | Cl | SCNCH₂CH₂CH₂Cl | do | Same as above. |
| 38 | H | Br | SCNCH₂CH₂CHBr  \|  C₆H₅ | do | thiazine-C₆H₅ |
| 39 | H | CH₂COOCH₂C₆H₅ | SCNCH₂CH₂CHCl  \|  C₆H₅ | do | Same as above. |
| 40 | H | CN | SCNCH₂CH₂CH₂Br | do | thiazine |
| 41 | C₂H₅O (5) | 1 CH₃ | SCNCH₂CH₂CH₂Cl | do | Do. |
| 42 | C₆H₅CH₂— (6) | 1 H | Same as above | do | Do. |
| 43 | CH₃—⟨C₆H₄⟩— (5) | 1 —CH₂COOCH₃ | do | do | Do. |
| 44 | C₄H₉C(O) | 1 —C₅H₁₁ | do | do | Do. |
| 45 | C₆H₅C(O) (5) | 1 H | SCNCH₂CH₂CH₂Br | do | Do. |
| 46 | C₄H₉ (6) | 1 H | Same as above | do | Do. |
| 47 | C₃H₇O— (5) | 1 (CH₃)₂NCH₂CH₂— | do | do | Do. |
| 48 | C₆H₅O (5) | 1 H | do | do | Do. |
| 49 | CH₃C₆H₄O (5) | 1 H | do | do | Do. |
| 50 | CH₃ (5)  CH₃ (6) | 2 —⟨C₆H₄⟩—I | do | do | Do. |
| 51 | —COOH | 1 —CH₂COOH | do | do | Do. |
| 52 | NH₂ (5) | 1 —⟨C₆H₄⟩—C₂H₅ | SCNCH₂CH₂CH₂Cl | do | Do. |

TABLE I—Continued

| | Column 1 | | | Column 2 Haloalkylisothiocyanate | Column 3 | |
|---|---|---|---|---|---|---|
| Ex. No. | R (position) | n | $R^1$ | | $(R)_n$ (position) $R^1$ | $R^2$ |
| 53 | $(CH_3)_2-N-(CH_2)_2-$ (6) | 1 | H | $SCNCH_2CH_2Cl$ | As in Column 1 | (thiazoline) |
| 54 | $CH_3OC(=O)$ (5) | 1 | H | Same as above | do | Same as above. |
| 55 | $C_6H_5OC(=O)$ (6) | 1 | Cl | do | do | Do. |
| 56 | $-COOH$ (5) | 1 | H | do | do | Do. |
| 57 | $CH_3$ (5) | 1 | H | do | do | Do. |
| 58 | $C_2H_5NHC(=O)$ (6) | 1 | Br | $SCNCH_2CH_2Br$ | do | Do. |
| 59 | $C_6H_5NHC(=S)$ (5) | 1 | $CH_3$ | Same as above | do | Do. |
| 60 | $CN$ (5) | 1 | $C_6H_5$ | do | do | Do. |
| 61 | $(CH_3)_2N(CH_2)_2NH$ (6) | 1 | $C_2H_5$ | do | do | Do. |
| 62 | $(C_6H_5-C(=O)-$ (5) | 1 | $CH_2Cl$ | $SCNCH_2CHCl$ / $C_6H_4NO_2$ | do | $O_2N-C_6H_4-$ thiazole |
| 63 | $C_6H_5-C(=O)NH$ (5) | 1 | $CH_2COOC_6H_5$ | $SCNCH_2CH_2Br$ | do | (thiazole) |
| 64 | $C_2H_5OC(=O)NH$ (6) | 1 | $C_4H_9$ | $SCNCH_2CHBr$ / $C_6H_5$ | do | $C_6H_5-$ thiazole |
| 65 | $C_6H_5-$ (5) | 1 | H | $SCNCH_2CH_2CHCl$ / $C_6H_5$ | do | $C_6H_5-$ thiazine |
| 66 | $CH_3C(=O)$ (5) | 1 | CN | $SCNCH_2CHCH_2Br$ / $CH_3$ | do | $CH_3-$ thiazine |
| 67 | $CH_3C(=O)NH$ (6) | 1 | H | $SCNCH_2CH_2CH_2Br$ | do | (thiazine) |

What is claimed is:
1. A compound of the structure

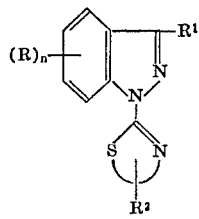

and wherein R is selected from the group consisting of hydrogen; lower alkyl; lower alkoxy; aryl; aryloxy; an acyl group of less than twelve carbon atoms selected from the group consisting of lower alkanoyl, lower alkenoyl, monocarbocyclic aroyl, monocarbocyclic aryl - lower alkanoyl, cycloalkanoyl, cycloalkenoyl, cycloalkyl-lower alkanoyls, and cycloalkenyl-lower alkanoyl; nitro; halo; cyano; amino; mono- or di-lower alkylamino; mono- or diarylalkylamino; mono- or di-lower alkylarylamino; mono- or di-arylamino;

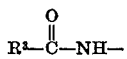

wherein $R^3$ is selected from the group consisting of hydrogen, lower alkyl, arylalkyl, alkylaryl, and aryl; dialkylaminoalkyl; carboxy; lower alkoxycarbonyl; aryloxycarbonyl; —NHCOOR$^4$ wherein $R^4$ is selected from the group consisting of alkyl and aryl; and

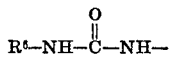

wherein Q is selected from the group consisting of oxygen and sulfur, and $R^5$ is selected from the group consisting of alkyl, aryl, and cycloalkyl; $R^1$ is selected from the group consisting of hydrogen; lower alkyl; cycloalkyl; aryl;

$$-(CH_2)_{n^1}-CO_2R^2$$

wherein $N^1$ is 0, 1, 2, or 3; cyano; halo; and dialkylaminoalkyl; $R^2$ is selected from the group consisting of hydrogen, lower alkyl, and aryl;

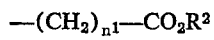

represents a 5 or 6 membered ring; $n$ is 1 or 2; wherein the term aryl, unless otherwise limited, refers to a mono- or bicarbocyclic aromatic ring system of 6 to 10 carbon atoms; wherein the term alkyl, both when used alone and when used as part of a larger group, refers to an aliphatic hydrocarbon group having up to seven carbon atoms; wherein the term cycloalkyl refers to saturated carbocyclic ring systems having from 4 to 6 carbon atoms; and acid-addition salts thereof.

2. A compound in accordance with claim 1 having the structure

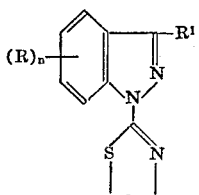

3. A compound in accordance with claim 1 having the structure

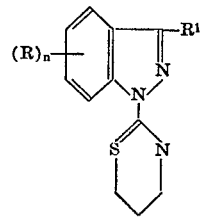

4. A compound in accordance with claim 1 having the structure

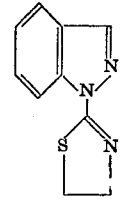

5. A compound in accordance with claim 1 having the structure

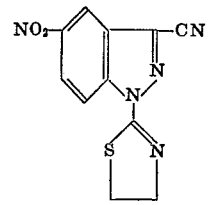

6. A compound in accordance with claim 1 having the structure

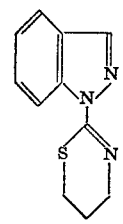

7. A compound in accordance with claim 1 having the structure

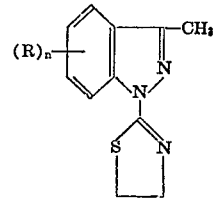

8. A compound in accordance with claim 1 having the structure

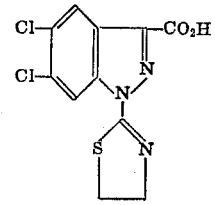

9. A compound in accordance with claim 1 having the structure

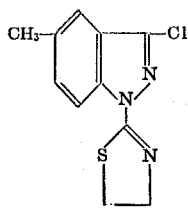

10. A compound of the structure selected from the group consisting of

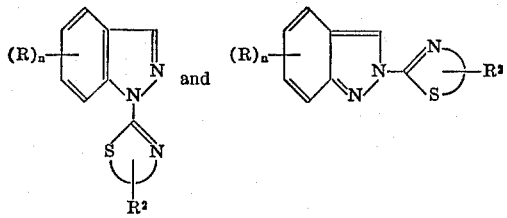 and

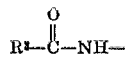

wherein R is selected from the group consisting of hydrogen; lower alkyl; lower alkoxy; aryl; aryloxy; an acyl group of less than twelve carbon atoms selected from the group consisting of lower alkanoyl, lower alkenoyl, monocarbocyclic aroyl, monocarbocyclic aryl-lower alkanoyl, cycloalkanoyl, cycloalkenoyl, cycloalkyl-lower alkanoyl, and cycloalkenyl-lower alkanoyl; nitro; halo; cyano; amino; mono- or di-lower alkylamino; mono- or di-arylalkylamino; mono- or di-lower alkylarylamino; mono- or di-arylamino;

$$R^3-\overset{O}{\underset{\|}{C}}-NH-$$

wherein $R^3$ is selected from the group consisting of hydrogen, lower alkyl, arylalkyl, alkylaryl, and aryl; dialkyl-aminoalkyl; carboxyl; lower alkoxycarbonyl; aryloxycarbonyl; —NHCOOR$^4$ wherein $R^4$ is selected from the group consisting of alkyl and aryl; and $$R^5-NH-\overset{O}{\underset{\|}{C}}-NH-$$

wherein Q is selected from the group consisting of oxygen and sulfur, and $R^5$ is selected from the group consisting of alkyl, aryl, and cycloalkyl; $R^1$ is selected from the group consisting of hydrogen; lower alkyl; cycloalkyl; aryl; —(CH$_2$)$_{n1}$—CO$_2$R$^2$ wherein $n^1$ is 0, 1, 2, or 3; cyano; halo; and dialkylaminoalkyl; $R^2$ is selected from the group consisting of hydrogen, lower alkyl, and aryl;

represents a 5 or 6 membered ring; n is 1 or 2; wherein the term aryl, unless otherwise limited, refers to a mono- or bicarbocyclic aromatic ring system of 6 to 10 carbon atoms; wherein the term alkyl, both when used alone and when used as part of a larger group, refers to an aliphatic hydrocarbon group having up to seven carbon atoms; wherein the term cycloalkyl refers to saturated carbocyclic ring systems having from 4 to 6 carbon atoms; and acid-addition salts thereof.

References Cited
UNITED STATES PATENTS

| | | | |
|---|---|---|---|
| 2,577,409 | 12/1951 | Emerson et al. | 260—243 |
| 3,264,294 | 8/1966 | McHugh et al. | 260—250 |
| 3,499,083 | 3/1970 | Levitt | 260—243 X |

JOHN M. FORD, Primary Examiner

U.S. Cl. X.R.

260—306.7; 424—246, 270

UNITED STATES PATENT OFFICE
CERTIFICATE OF CORRECTION

Patent No. 3,759,903          Dated September 18, 1973

Inventor(s) Rudiger D. Haugwitz and Venkatachala L. Narayanan

It is certified that error appears in the above-identified patent and that said Letters Patent are hereby corrected as shown below:

Column 2, line 20, the word reading "core-" should be:
-- corre- --.

Column 4, Example 17, that portion of the formula reading "$C_5H_5$" should be: -- $C_6H_5$ --.

Column 5, The example following number 33 should be: -- 34 --.

Column 7, line 49, please delete this line completely and insert in its place the following:
-- The molar ratio of indazole (III) to haloalkyliso- --.

Column 8, line 53, Example 6, Column R, the compound:

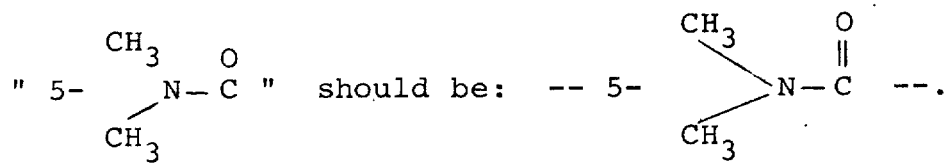

Column 9, lines 61 and 71, the word: "mag." should be: -- mg. --.

Column 12, Table 1, the formula under column 3:

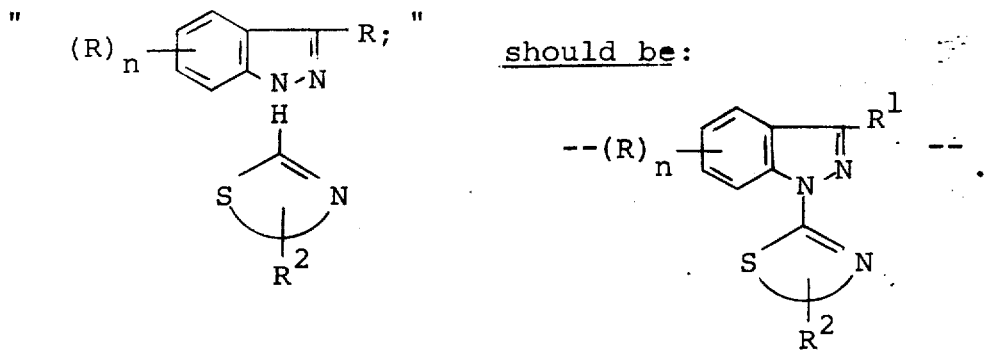

UNITED STATES PATENT OFFICE
CERTIFICATE OF CORRECTION

Page 2

Patent No. 3,759,903  Dated September 18, 1973

Inventor(s) Rudiger D. Haugwitz and Venkatachala L. Narayanan

It is certified that error appears in the above-identified patent and that said Letters Patent are hereby corrected as shown below:

Column 12, Table 1, that portion of column 3 reading:

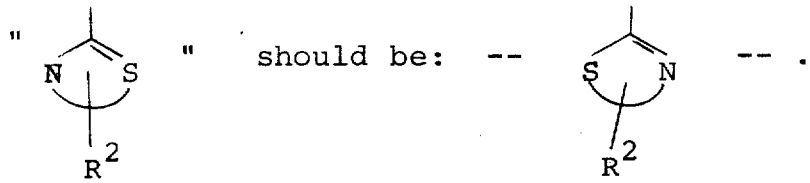

Column 12, Table 1, Example 6, that portion reading:
"SCH-CH$_2$-CH$_2$-Br" should be: -- SCN-CH$_2$-CH$_2$-Br --.

Column 11, Table 1, after example 6 insert: -- 7 --.

Column 14, Table 1, Example 8, that portion reading:
" SCH-CH$_2$-CH$_2$-Br " should be: -- SCN-CH$_2$-CH$_2$-Br --.

Column 14, Table 1, column 3, that portion of the formula
Column 16, reading:
and
Column 18, " [structure with $R^1$, N-N, H] " should be: -- [structure with $R^1$, N-N] --.

Column 14, Table 1, Example 20, that portion reading:
" SCH-CH$_2$CH$_2$CH$_2$-Br " should be: -- SCN-CH$_2$CH$_2$CH$_2$-Br --.

Column 17, Example 62, delete the left parenthesis before:

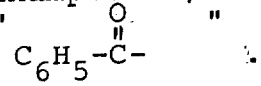

UNITED STATES PATENT OFFICE
CERTIFICATE OF CORRECTION

Page 3

Patent No. 3,759,903  Dated September 18, 1973

Inventor(s) Rudiger D. Haugwitz and Venkatachala L. Narayanan

It is certified that error appears in the above-identified patent and that said Letters Patent are hereby corrected as shown below:

Column 19, lines 36 - 40, that portion of claim 1 reading:

"$R^6\text{-NH-}\overset{O}{\overset{\|}{C}}\text{-NH-}$" should be: -- $R^5\text{-NH-}\overset{O}{\overset{\|}{C}}\text{-NH-}$ --.

Column 19, line 48, "$N^1$" should be: -- $n^1$ --.

Column 22, lines 4 - 6, that portion of claim 10 reading:

"$R^5\text{-NH-}\overset{O}{\overset{\|}{C}}\text{-NH-}$" should be: -- $R^5\text{-NH-}\overset{O}{\overset{\|}{C}}\text{-NH-}$ --.

Signed and sealed this 19th day of March 1974.

SEAL)
ttest:

DWARD M. FLETCHER, JR.
ttesting Officer

C. MARSHALL DANN
Commissioner of Patents